(12) United States Patent
Booth

(10) Patent No.: US 9,951,551 B2
(45) Date of Patent: Apr. 24, 2018

(54) PORTABLE STORAGE SAFE WITH FLEXIBLE INTERNAL LOCKING CAGE

(71) Applicant: STACKARMS, LLC, Churchville, PA (US)

(72) Inventor: Brian D Booth, Churchville, PA (US)

(73) Assignee: STACK ARMS, LLC, Churchville, PA (US)

(*) Notice: Subject to any disclaimer, the term of this patent is extended or adjusted under 35 U.S.C. 154(b) by 0 days.

(21) Appl. No.: 15/448,981

(22) Filed: Mar. 3, 2017

(65) Prior Publication Data

US 2017/0198517 A1   Jul. 13, 2017

Related U.S. Application Data

(63) Continuation of application No. 15/092,288, filed on Apr. 6, 2016, now Pat. No. 9,625,234.

(60) Provisional application No. 62/143,935, filed on Apr. 7, 2015.

(51) Int. Cl.
*E05G 1/04* (2006.01)
*E05G 1/00* (2006.01)
*E05G 1/024* (2006.01)
*E05B 65/00* (2006.01)
*F41H 5/02* (2006.01)

(52) U.S. Cl.
CPC .......... *E05G 1/04* (2013.01); *E05B 65/0075* (2013.01); *E05G 1/005* (2013.01); *E05G 1/024* (2013.01); *F41H 5/023* (2013.01)

(58) Field of Classification Search
CPC .. F41C 33/06; B60R 11/00; B60R 2011/0003; B60R 2011/0059; A45C 13/18; E05G 1/04; E05G 1/005; E05G 1/024; E05B 65/0075; F41H 5/023
USPC .............................................................. 70/18
See application file for complete search history.

(56) References Cited

U.S. PATENT DOCUMENTS

| 6,026,662 | A | * | 2/2000 | Schlipper | ............... | A45C 3/001 |
| | | | | | | 70/14 |
| 2003/0110818 | A1 | * | 6/2003 | Schlipper | ........... | A45C 13/1046 |
| | | | | | | 70/18 |
| 2006/0180619 | A1 | * | 8/2006 | Schlipper | ............... | A45C 3/001 |
| | | | | | | 224/191 |

(Continued)

*Primary Examiner* — Corey Skurdal
(74) *Attorney, Agent, or Firm* — Law Offices of Robert F. Zielinski, LLC

(57) ABSTRACT

A storage safe formed from a flexible fabric having a generally rectangular closeable outer shell, at least one longitudinal cable conduit channel and at least one latitudinal cable conduit channels and a plurality of wire cables of predefined length substantially disposed within said cable conduit channels wherein said longitudinal and latitudinal cables traverse the interior surfaces of the outer shell and further wherein said wire cable ends extend beyond said cable conduit channels; adjustable cable locks in operative contact with each wire cable end; at least one storage container disposed within said outer shell, wherein the wire cables are positioned within said wire conduit channels are drawn down upon and tightened on said storage container to form a wire cage and said each adjustable cable lock engages the opposite end of said wire cables end to securely lock the wire cables in place and further comprising a plurality of voids on a lower surface thereof and a separate cable segment and adjustable lock for securing said safe to a structure tie down.

19 Claims, 6 Drawing Sheets

(56) References Cited

U.S. PATENT DOCUMENTS

| | | | | |
|---|---|---|---|---|
| 2011/0214787 A1* | 9/2011 | Schulte | .................. | A45C 13/00 |
| | | | | 150/102 |
| 2011/0233253 A1* | 9/2011 | Worthington | .......... | A45C 13/18 |
| | | | | 224/645 |
| 2011/0278288 A1* | 11/2011 | Fuller | .................... | F41C 33/06 |
| | | | | 220/6 |
| 2012/0152776 A1* | 6/2012 | Camp | ................. | F41C 33/0263 |
| | | | | 206/317 |
| 2014/0090942 A1* | 4/2014 | Schlipper | ............... | A45C 3/001 |
| | | | | 190/125 |
| 2015/0237981 A1* | 8/2015 | Godshaw | ............ | A45C 13/185 |
| | | | | 150/102 |

* cited by examiner

PORTABLE STORAGE SAFE WITH FLEXIBLE INTERNAL LOCKING CAGE

The present patent application claims the benefit of U.S. Provisional Patent Application Ser. No. 62/143,935, filed Apr. 7, 2015, and application Ser. No. 15/092,288 filed Apr. 6, 2016 the entireties of which are hereby incorporated by reference.

FIELD OF THE INVENTION

This invention relates to portable and fixed storage cases affixed to an interior surface of mobile structures, including motor vehicles and boats, as well as to immobile structures, including dwellings, offices, garages and other buildings. More specifically, the present invention to multi-component, unobtrusive, storage cases having an outer shell housing and an internal locking cage wherein the device is detachably affixed to a surface in which integral securing and mounting mechanisms are concealed from view.

This invention also relates to storage lockers which are unobtrusive and provide a rigid, semi rigid or flexible outer shell housing and an internal locking cage wherein the storage locker can detachably affixed to a surface in which integral securing and mounting mechanisms are concealed from view.

This invention also relates to portable and fixed storage cases intended for use in residences or small business where it would be unduly expensive or impractical to purchase a safe of conventional design. In addition to the fact that safes of common design are generally considered expensive, such safes are quite heavy, conventional safes are not generally portable or readily transportable by individuals who might wish to secure valuables in a home or similar location with the ability to easily change the location and keep the stored contents secure.

BACKGROUND

A wide variety of storage safes and cases are currently available. However, there is no universal solution to fill every role, or to fit every budget. Storage options are intended to perform one or more of the following principal tasks, which they do with varying degrees of effectiveness. These include securing and storing valuables out of sight; protecting valuables from physical damage; and acting act as a theft deterrent.

For example, gun case devices capable of being carried in and/or used in motor vehicles and homes are well known. Gun cases, referred collectively herein as storage cases, are for storing a gun such as handgun, shotgun or rifle. Gun cases of this type currently available on the market are typically weather-resistant and/or weather-proof, and are made from durable hard or soft material. Most storage containers have a padded, shock-absorbing interior to protect the firearm during transportation. Some gun cases even have multi-purpose storage compartments or modules that are attached or integrated to the interior and/or exterior of the case.

Examples of such gun cases can be found in the patent literature as well as commercial brochures and advertisements for storage containers. In its most rudimentary form, U.S. Pat. No. 2,531,550 to Bradley et al. discloses a commonly used suitcase-like gun case formed from a moldable material, such as a synthetic resin, which has compartments or cavities for the gun parts and for accessories, in which the carrying handle is directly secured to the part of the case in which the gun parts and accessories are supported. The gun case protects the gun parts from moisture and other abrasive or corrosive materials and can conveniently be used to support and protect the gun from coming in contact with the ground. The cavities may include cover plates, felt pads or other securing means to hold the gun within the cavities during transportation. The gun case of the Bradley disclosure is a type of one of the most common commercially available storage containers and had no provisions for securely mounting it to a motor vehicle.

U.S. Pat. No. 2,706,036 to Neal relates to a shock proof gun case especially adapted for guns equipped with telescopic sights or other mechanism easily rendered inoperative if the gun is subjected to severe jars or strains. The case includes an internal compartment surrounded on all sides by a heavy padding of foam rubber or its equivalent, thereby protecting the gun and its accessories from injury or being thrown out of adjustment by the rubber cushion. The rubber cushion is of sufficient thickness that some pressure is required to close the case, thereby causing the gun to be partially imbedded in the cushion when at rest. The gun case is not particularly suited for motor vehicles.

U.S. Pat. No. 3,326,385, to Pinkerton et al., pertains to a vehicle mounted gun rack including various mechanical locking devices for locking guns in a rack for safe keeping therefor and an electrical locking means operatively connected to the vehicle battery. While adapted for motor vehicles, the firearms remain in full view at all times.

U.S. Pat. No. 3,857,491 to Townsend et al. also relates to gun racks of the horizontal type with means provided to lock guns in position against unauthorized removal and discloses a vehicle mounted gun rack having a slidable mechanism thereon for cooperating with the stock portion of a gun to lock the gun in position in said gun rack and a key operated lock for operating the slidable mechanism to lock said gun in position or to enable removal of said gun from said rack. The locking gun rack may offer some measure of security by providing locks for the guns but the guns remain in full view at all times.

U.S. Pat. No. 5,495,969 to Cardenas discloses a portable gun rack adapted to engage the rear of the back seat of a sports vehicle which allows the guns to be supported in such a manner so as to have them oriented scope-side down which is a more stable manner for transport. The rack is secured to the vehicle seat via tie-downs and a decorative over cover for the gun rack is provided to help to disguise the presence of the weaponry and thus to reduce the incidence of theft. The gun rack disclosed offers little by way of effective security for the guns or for hiding the gun rack and seriously deterring theft.

U.S. Pat. No. 5,683,021 to Settina teaches a gun case for mounting in a vehicle including a container within which the gun is substantially entirely contained and an electrically actuated locking container lid. The lock includes a plurality of latches spaced along the gun case and a common actuator plate which slides longitudinally to unlock the latches in response to an electrical actuator device such as a solenoid or an electric motor. The container pivots down to a lowered unlocked position away from the lid to enable the gun to be removed from the container and a key actuated mechanism moves the actuator plate to unlock the container when the electrical actuator does not operate.

U.S. Pat. No. 5,850,796 to Cislo teaches a gun lockbox resistant to forced entry including a guard member formed to an inside edge of a housing half, and one or more locks in an opposing housing half which engage the guard member, for securing the housing halves together and preventing insertion of a prying tool there between. The gun lockbox may also include clip members to attach the lockbox to a stationary object within a transport vehicle or to a wall, the clip members preferably consisting of complementary brackets with the attachment hardware being located inside the lockbox, to prevent easy theft of the lockbox outright.

U.S. Pat. No. 6,443,346 to Haas relates to a gun rack for nondestructive use in any of a variety of vehicle models—generally comprising two substantially L-shaped vehicle engagement members, each having a leg portion and a foot portion, and a cross bar disposed between the upper end of the leg portions. The cross bar, or member, is dependently supported by the leg portions and comprises at least one trough adapted to support the stock portion of a gun. The gun rack is specifically adapted for repeated secure placement in, and total removal from, a vehicle without incurring damage to the vehicle during placement, use or removal.

U.S. Pat. No. 8,104,313 to Wolfe pertains to a security enclosure for a handgun includes an enclosure base having an opening to an interior portion and a cover configured to selectively cover the opening in the enclosure base. The cover may be configured in a manner to rotate from a first position in which the cover blocks access to the interior portion of the enclosure base to a second position in which the cover allows access to the interior portion of the enclosure base. A gun enclosure may be rotatably disposed within the enclosure base. The security enclosure may be configured in a manner allowing it to be securely affixed within the vehicle so that it cannot easily be removed by unauthorized persons. A biometric recognition device may be configured to operatively unlock the cover when exposed to a required feature of an authorized user.

U.S. Pat. No. 8,186,188 to Brown teaches a system for securely storing a weapon within a tray including a portable safe having an interior space sized and shaped for retaining the tray and the contained weapon. In addition, the system includes a mounting module attachable to a fixed surface including specifically motor vehicles. The mounting module includes an interior space for holding the portable safe and an access control system for locking the portable safe within the interior space of the mounting module. The access control system allows access by an authorized user and denies access of the weapon within the portable safe to an unauthorized user. The weapon is contained in the tray, the tray is retained in the portable safe and the portable safe is held in the interior space of the mounting module. Multiple mounting modules can be positioned throughout a home, office, vehicle, or wherever rapid access, convenience and weapon security are desired.

U.S. Pat. No. 8,752,745 to Bond et al. teaches a firearm case which is attachable to a motor vehicle and specifically a motorcycle. The case comprises a frame which holds and encloses a firearm. The frame includes a firearm lock and latch that securely locks the firearm in place. A housing surrounds the frame as to enclose the frame and firearm, safe from the weather, theft and minor damage. An optional remotely operated control system unlocks the firearm case and the firearm lock simultaneously for quick and easy access to the firearm.

Additionally, patent publication US 2013/0284780 to Beckwith et al. relates to a multi-compartment gun case for front or rear mount on an ATV type motor vehicle. The gun case comprises an upper storage compartment suitable for storage of a rifle and a lower storage compartment suitable for storage of other equipment. The upper storage compartment opens towards the seating position of the ATV to allow for quick and easy access of a stored rifle to the driver without the need to dismount, while the lower storage compartment opens away from the driver towards an area accessible when dismounted so that a user does not need to mount the ATV to access the lower storage compartment.

In addition to gun storage type cases, portable storage cases for storing valuables such as money, jewelry, family heirlooms, legal documents, etc. are also well known. For example, U.S. Pat. No. 6,581,424 to Oliver is directed to a portable lock box including a box-shaped base member having an open front and top and a box-shaped front closure member having an open back and top. The base and front closure members include complementary horizontal support members and the front closure member is dimensioned to be slidably received through the open front of the base member to form a base assembly that may be filled with ballast. Respective support members define apertures through which elongate fasteners may be extended when aligned so as to couple the front closure member to the base member. A top panel is configured for slidable engagement with the base member so as to cover the open top. The top panel and base member include corresponding bores through which a rod may be extended and locked. Selected items may be stowed for safekeeping in a compartment mounted to an underside of the top panel.

U.S. Pat. No. 5,513,580 to Franks is for a lock box for installation in closets. This invention discloses a lockbox or safe for storing possessions, which can be installed in a closet in a manner that requires opening the lockbox before it can be removed from the closet. This is done by providing one or more extensions (such as side walls, rigid shafts, or end caps) that can be extended outwardly from either or both sides of the lockbox. When retracted, the lockbox has dimensions that allow it to be inserted into the closet through the closet door. After it is positioned on the floor of the closet, the compartment door is opened. This provides access to a mechanism that controls the positioning of the extensions, such as bolts or cotter pins that interact with multiple spaced holes in sliding mechanisms. The extension locking mechanism is unlocked, and the extensions are pushed outwardly until they press against the side walls of the closet. As long as the lockbox remains locked, the extensions pressing against the side walls of the closet will prevent the lockbox from being removed from the closet, unless the door jamb and/or closet walls are destroyed.

U.S. Pat. No. 4,561,362 to Wildmuth is for a mobile-immobile safe. The mobile-immobile safe is provided with internal removable excess mass which renders the container relatively immobile until the mass is removed. The mass may be, for example, water stored between inner and outer walls of the container or lead shot, steel balls or antifreeze. Normal access to the mass for removal thereof, in order to render the container relatively mobile, is available only after the door of the container has been opened.

Another example can be found in U.S. Pat. No. 4,438,606 to Chardon et al. is for a shelter for protecting large-size objects. A shelter for protecting large-size objects, such as open-air machines, cycles, motorcycles, windsurfers, etc. . . . comprises, on its front face, a door giving access to the interior of the shelter and, in its lower part, a flooring on which the object or objects to be protected with beneath the flooring, a compartment in which is housed a heavy mass of which the weight is transferred onto the walls of the shelter, in order to considerably increase the total weight of the shelter and prevent easy handling thereof.

U.S. Pat. No. 4,249,684 to Miller et al. is for a removably anchored box. The removably anchored box provides an easily transportable, general purpose box which may be carried about by hand and then anchored to rails and locked in place. Once the lid is locked on the box, no one without a key can move the box from the anchor rails. The invention is primarily intended as a portable trunk for mounting on a truck; however, it may be used anytime that a box is to be mounted on a chassis, such as a toolbox mounted on a wheeled dolly, a tool room shelf, or the like, for example.

U.S. Pat. No. 4,664,041 by Wood is for a beach locker. A security lock box for use primarily at beaches having a vertical shaft terminating at its lower end with a screw and an upper end which releasably engages a crank which can be utilized to turn the shaft and by virtue of the screw engage the shaft into the ground, subsequent to which the crank is released from the shaft, the shaft tip inserted through a hole in the lock box, a keeper is inserted on the shaft to retain the lock box, and the lock box is locked, securing within the tip of the shaft so that it may not be rotated and any valuables which have been put into the box.

Finally, Publication No. US20100282136 A1 discloses a portable vault assembly that can provide secure on-site storage, yet may be disassembled easily for removal to a new location when desired. The portable vault includes sections that are independently portable but which feature a combined weight that makes it impossible for the secured container, or vault, to be carried. Further embodiments rely upon features of the site where the vault is assembled to create a secure space, and independent portable vaults may be co-joined to form integrated but separate storage compartments, or one large central storage bin, as desired. Anchoring options, and further theft deterrence features are also disclosed including integration to the work site environment.

It will be appreciated that where storage cases in the form of lock boxes, cabinets, chests, etc., are reasonably transportable, these cases usually suffer from deficiencies from the standpoint of security. Filing cabinets, dressers, and chests and the like are commonly provided with locks; however, such locks can typically be easily bypassed. For example, it is not uncommon for one to break into such structures with a crowbar or other tool, and since this could normally be accomplished with minimum delay, the security of such structures is not of great significance. While these types of structures may serve, for example, to prevent access by children, they would not be suitable to prevent theft. Where the structures are portable enough to be easily handled by individuals, the entire structure including its contents could also be equally easily transported by thieves to a remote location where they could obtain access to the storage case contents at their leisure.

It will be appreciated that the prior art lacks a suitable storage cases for both protecting and securely transporting valuables that may be unobtrusively and temporarily or permanently anchored to an interior surface of mobile structures as well as immobile structures while concealing both the contents of the storage case and the means by which the storage case is secured.

It will likewise be appreciated that most prior art storage cases are also easily recognizable to potential thieves. For example, storage containers typically look like storage containers; most safes are generally readily visually identifiable, essentially announcing to even the untrained observer "VALUABLES INSIDE!" Thus, in many instances, these cases and safes lack any real theft deterrent value especially when such cases come into plain view of an observer who may recognize the nature of the case or safe and wish to steal or otherwise gain unauthorized access to the contents within the case or safe. Additionally, known prior art cases of these types lack the ability to covertly hide the nature of the case.

In an embodiment of the present invention, the storage case may include an outer cover or shell of durable material which may conceal or otherwise divert attention away from the actual nature of the case. For example, the outer shell could have the appearance of a duffle bag or other piece of luggage. Alternatively, it could have the appearance of a cardboard box or other structure such as a piece of furniture such as a small filing cabinet, a small chest of drawers or hassock, even a trash can. Preferably still, the outer cover is rigid, semi-rigid or soft-sided but which is cut, rip or tear proof and largely impervious to casual tampering. Significantly, the outer cover also houses the internal cable wire systems that are integral to the securing mechanism of both the contents of the case and of the case to a structure on to which the case is permanently or semi-permanently attached.

Prior to applicant's invention disclosed in application Ser. No. 15/092,288, there was no effective way to secure firearms to mobile structures like vehicles, such as pickup trucks and SUVs. Most pickup trucks lack locking trunks, and there are no means to secure cases onto the flat bed area. Similarly, in SUVs there is virtually nothing to prevent a thief from simply smashing a vehicle window and grabbing a storage case which is left out in plain view.

The safe of the present invention has the advantage over the prior art in that the valuables are completely contained within an outer shell within which a storage case is locked securely to protect it from being tampered with by unauthorized personnel and to prevent it from removal by intentional efforts of unauthorized persons. Another advantage is that the outer protective container housing the storage case allows the storage safe to be displayed in such a way so as to not reveal or even suggest the contents therein.

Still another advantage of the storage safe of the present invention is that the rigid, semi rigid, or soft-sided outer shell container provides added measures against tampering with and/or removal of the contents of the safe. The storage safe of the present invention has the added advantage that it may be securely permanently or semi permanently mounted to a structure in a secure storage position using mounting tie downs and brackets in such a way that the securing mechanisms for the storage safe remain substantially obstructed from the plain view of an observer.

SUMMARY OF THE INVENTION

In an embodiment of the present invention, an improved, locked storage safe for mounting in a mobile or immobile structure is provided which securely and unobtrusively stores valuables in an inner storage case container so that the inner storage case container is substantially entirely contained within the storage safe and cannot be removed from the storage case.

In an embodiment of the present invention a storage safe including an inner storage case container which can be temporarily or permanently mounted to a structure within the storage case container is locked to the storage safe is provided wherein the storage case container can be opened to enable the contents thereof to be removed therefrom without dismounting the storage case container or the storage safe from the structure.

In another embodiment of the present invention a storage safe with an improved locking mechanism including an outer rigid or semi rigid shell made of tamper resistant materials into which an inner storage case container is provided and the storage safe can simultaneously secured to a mobile or immobile structure.

In yet another embodiment of the present invention a storage safe with an outer hard sided protective shell housing the storage case container allows the storage safe to be displayed in such a way so as to not reveal or even indicate the contents therein is provided.

In another embodiment of the present invention a storage safe is provided including a storage case container which may be securely permanently or semi permanently mounted in a vehicle using pre-installed and/or aftermarket structure mounting tie downs and brackets in such a way that the securing mechanisms for the storage safe remain substantially obstructed from the plain view of an observer.

Finally, in an embodiment of the present invention a portable storage safe is provided which upon removal from a mobile structure can be securely locked to other mounting devices that may be found in non-mobile structures such as residences, places of businesses and hotel rooms.

BRIEF DESCRIPTION OF THE DRAWINGS

The invention is best understood from the following detailed description when read in conjunction with the accompanying drawings wherein like reference numerals refer to like parts throughout the several views and embodiments. It is emphasized that, according to common practice, the various features of the drawings are not to-scale. On the contrary, the dimensions of the various features are arbitrarily expanded or reduced for clarity. Included in the drawings are the following figures.

DETAILED DESCRIPTION OF THE DRAWINGS

Figure 1:
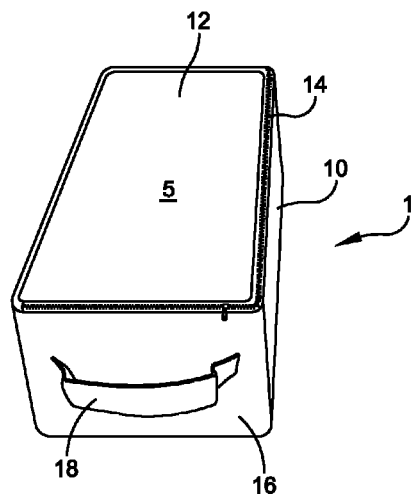
FIG. 1 is a front top-perspective view of the outer shell of the storage safe of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion.

These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to exemplified embodiments and examples. Accordingly, the invention expressly should not be limited to such exemplified embodiments illustrating some possible but non-limiting combination of features that may be provided alone or in other combinations of features; the scope of the invention being defined by the claims appended hereto.

FIG. 1 shows a front top-perspective view of an embodiment of the storage safe of the present invention. As shown, storage safe 1 consists of outer shell 5 which is generally rectangular in shape. Outer shell 5 is preferably fabricated from a rigid, semi-rigid and/or flexible materials and combinations thereof, including bullet-resistant materials (also called ballistic materials or, equivalently, anti-ballistic materials) which may be rigid or supple. The shell materials may be complex like carbon fiber composite materials, or they may be basic and simple, such as metals like steel or titanium and can include rip-proof, tear proof and cut-proof nylon and/or composite synthetic fabrics such as ballistic nylon and others including those sold under the brand names Kevlar®, CUT-TEX® pro, KOVENEX®, DuraFab® and other synthetic fabric materials with similar characteristics. Rigid ballistic plastics, ballistic composites and ballistic nylons are also preferred for use in fabricating outer shell 5. As used herein ballistic also refer to any nylon or composite fabric that is made with a "ballistic weave", typically a 2×2 or 2×3 basket weave. It can be woven from synthetic fiber yarns of various deniers such as 840 denier and 1680 denier, referring to the weight, not the strength, of the fabric. For example, a double weave 1050 denier fabric is the strongest and most durable fabric for its denier weight level. The 1680 denier is a good alternative that has a similar strength but lighter weight than the 1050 as it resists abrasion and tearing, ballistic nylon is also typically used for luggage and in the bottom of bags made of a lighter nylon or other fabric.

It will be appreciated that while semi-rigid and/or flexible woven fabric type materials are useful in the present invention, other materials alone or in combination with rigid, semi-rigid and/or flexible fabric materials which may have greater or enhanced rigidity characteristics may be employed in the fabrication of outer shell 5. Such materials include bullet proof and bullet resistant rigid and semi rigid high density plastics, plastic resin composites, fiberglass materials, metal armor and/or combinations thereof.

Outer shell 5 includes the front wall 10, top wall 12, a pair of sidewalls 16 at either end of the front wall and a rear wall (not shown) defining a generally rectangular shape. Positioned above sidewalls 16 and front wall 10, is closure element 14 separating top wall 12 at the upper side and front wall surfaces. It will be appreciated that top wall 12 is hingedly connected to the rear wall of outer shell 5 due to the construction of the outer shell but in some embodiments, top wall 12 may be entirely removable. Closure element 14 may be formed of nylon, brass and other metal alloys which are resistant to tampering and/or forcible entry by cutting or prying. Closure element 14 may also be provided with an external lock for securing the closure to one end of outer shell 5. Other closure devices such as Velcro® hook and loop fasteners and locking snap-fit, twist or turn and lock and tuck and push lock type devices, conventional locks and, digital tumblers which are adapted for keyed entry may also be used. Carrying handle 18 which can be present on either or both sidewalls 16 may also optionally be included. In the embodiment shown, carrying handle 18 not only provides a means to grip and carry the outer shell of storage safe 1.

Figure 2:
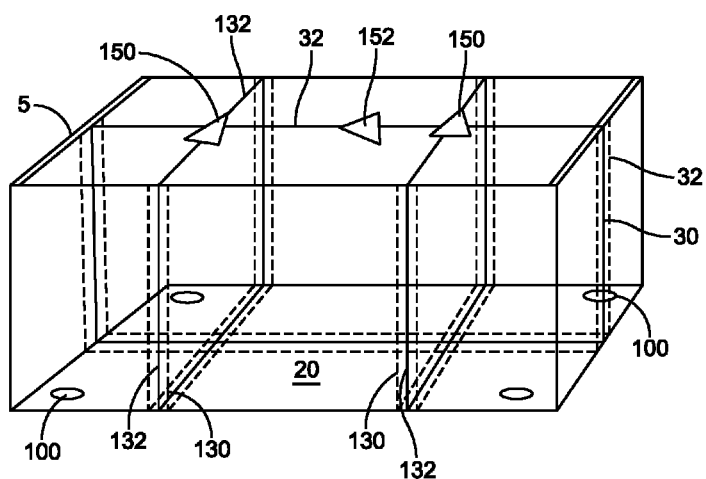
FIG. 2 is a partial phantom view of the interior surface of the outer shell shown in FIG. 1.

In FIG. 2 there is shown partial phantom view of the interior surface of the outer shell 5 shown in FIG. 1. Corresponding generally to the inner surfaces of front wall 10, the rear wall and outer shell base 20 are latitudinal cable conduits 132 which are formed into the material of the outer shell 5. Latitudinal cable conduits 132 define a path through which latitudinal cable 130 of predefined length may traverse with the respective ends of latitudinal cable 130 overlapping and meeting in adjustable latitudinal lock 150. It will be appreciated that in the embodiment shown, at least one or more latitudinal cables 130 may be utilized in outer shell 5. Corresponding generally to the inner surfaces of sidewalls 16 and outer shell base 20 are longitudinal cable conduits 32 which are likewise integrally formed into or into a lining of outer shell 5. Suitable fabrics materials for lining outer shell 5 include acrylics and acrylic blends.

Longitudinal cable conduits 32 define a path through which longitudinal cable 30 of predefined length may traverse with the respective ends of longitudinal cable 30 overlapping and meeting in adjustable longitudinal lock 152. Longitudinal cable 30 may also be threaded underneath latitudinal cable 130 or vice versa. It will likewise be appreciated at least one or more longitudinal cables 30 may also be utilized in outer shell 5. Preferably two adjustable latitudinal cables 132 run from the top of the outer shell around the walls of the unit and back up to the top of the interior surface via adjustable latitudinal lock 150. A longitudinal cable 30 is run from the top of the inner surface lengthways around the outer shell and locked on top via adjustable longitudinal lock 152. It will be understood that that longitudinal and latitudinal cables 30 and 130 are hidden from view and are protected in their respective cable conduits.

Longitudinal and latitudinal cables 30 and 130 respectively, are formed of high strength stainless steel cable which is both relatively thin and flexible and also has a high breaking strength. It may be uncoated or coated. Some preferred stainless steel cable types are those designed primarily for use in rigging, the aircraft industry and in military applications ranging in size to up to ⅜ inch or approximately 10 mm. Stainless steel cable is especially desirable because it is durable and not easily cut without the aid of specialized tools. Additionally, typically specified by the number of strands in the rope, times the number of wires in each strand. For example, the notation 7×19 means that the rope has seven (7) strands and there are nineteen (19) wires in each strand. The break strength of the stainless steel preferably exceeds 250 lbs. The overlapping longitudinal and latitudinal cables 30 and 130 effectively form a flexible inner cage that is capable of surrounding a consumer's existing gun case (or storage containers) and in connection with longitudinal and latitudinal adjustable cable locks 150 and 152 can tightly lock around the storage containers thereby providing a very high level of deterrence against theft. In use, longitudinal and latitudinal adjustable cable locks 150 and 152 are cinched down tightly around the inner storage case container and then locked from the top as is shown more clearly in FIG. 5.

Figure 3:
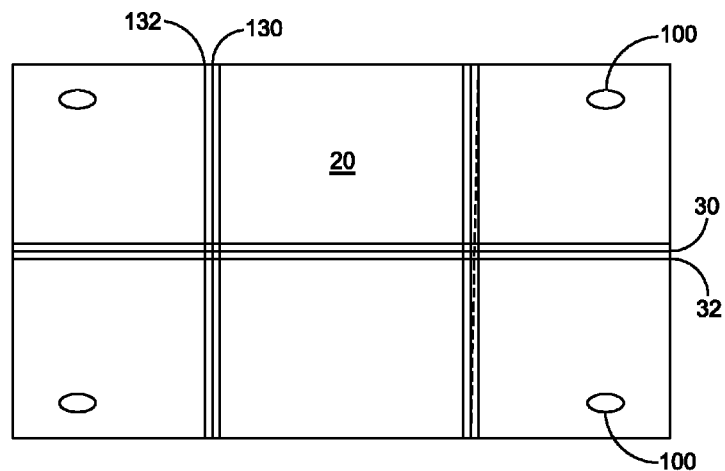
FIG. 3 is a top down view of an interior base of the outer shell shown in FIG. 2.
Figure 4:
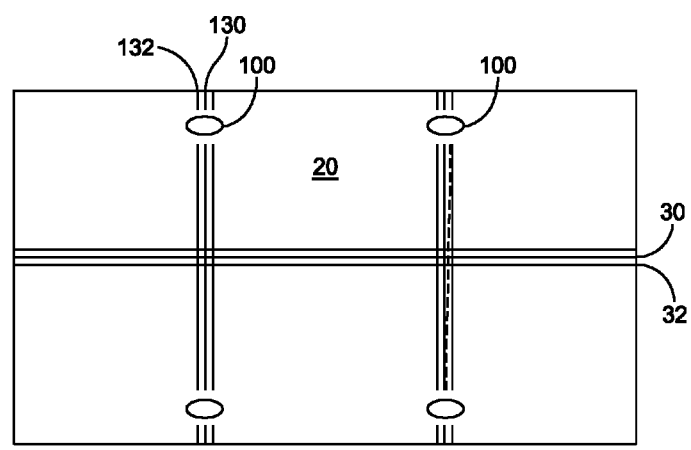
FIG. 4 is a top down view of an alternative embodiment of interior base of the outer shell shown in FIG. 2.

FIG. 3 and FIG. 4, show two alternative top down views of an interior base of the outer shell shown in FIG. 2. As can be seen, longitudinal and latitudinal cable conduits 32 and 132 define a path through which longitudinal and latitudinal cable 30 and 130 traverse outer shell base 20. Within outer shell base 20 are a plurality of cable voids or openings 100 which allow for internally securing outer shell 5 via a securing member (not shown) to a structure tie or other securing device which is permanently affixed to a mobile or immobile structure. It will be understood that the type of securing member can include a separate length or lengths of stainless steel cable of the type used for longitudinal and latitudinal cables 30 and 130 and may also include (as may be seen with respect to FIG. 4) a portion of longitudinal and latitudinal cables 30 and 130 which can be treaded into and through a structure tie down. When the securing member or longitudinal and latitudinal cables 30 and 130 are in operative contact with the structure tie or other securing device permanently affixed to a mobile or immobile structure (collectively, structure mounting systems), the tightening of the longitudinal and latitudinal adjustable cable locks 150 and 152 will cause outer shell 5 to draw down tightly on the structure tie down and in so doing, substantially cover the structure tie down so as to make both the structure tie down and the securing points below outer shell 5 unobservable to the ordinary viewer. Cable voids 100 may further be reinforced with metal alloy grommets to enhance the secure attachment of outer shell 5 to the vehicle mounting system.

Figure 5:
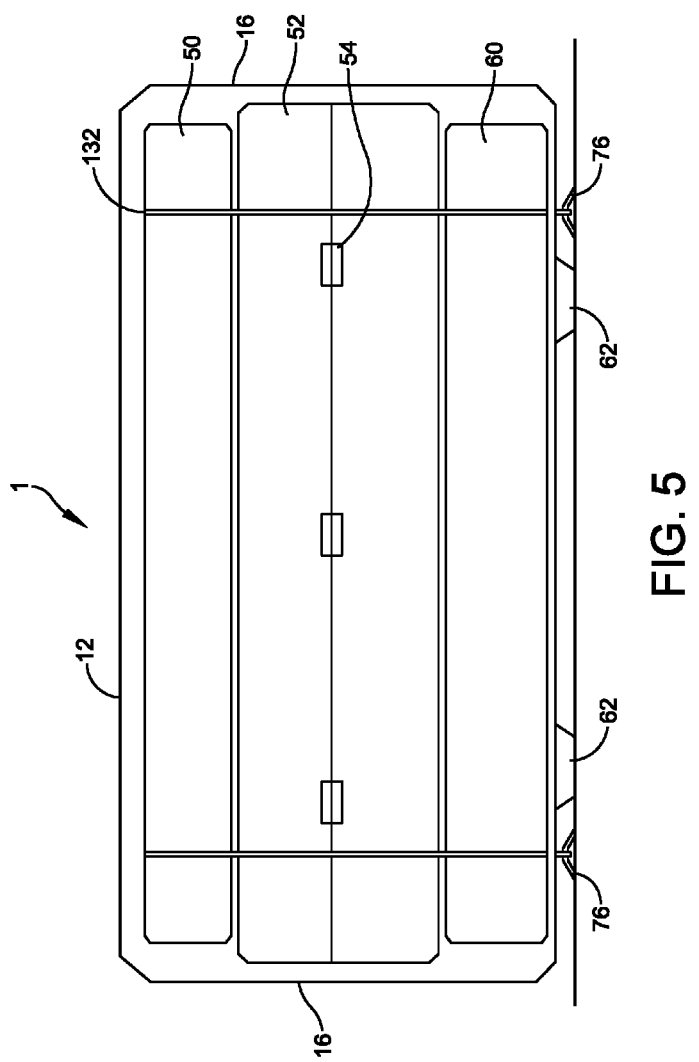
FIG. 5 is a cross sectional view of an embodiment of the storage safe of the present invention.

FIG. 5 shows a cross sectional length-wise view of an embodiment of the storage case 1 of the present invention. Positioned within outer shell 5, and bounded by top surface 12 sidewalls 16 and outer shell base 20, is storage container 52. Storage case 52 in this embodiment measures approximately 40"×11"×5" and is of the "break-down" type that may be purchased from a specialty dealer of valuables containers for items such as firearms, jewelry, securities and other items of high value. Approximately midline in storage container 52 is storage container hinge element 54 which typically allows storage container 52 to be opened 180 degrees to an essentially flat, planar position to permit access to the firearm being housed and transported and the other contents of the case. It will be appreciated that outer shell 5 is of appropriate dimensions to accommodate a storage container or storage containers of a variety of sizes.

Figure 7:
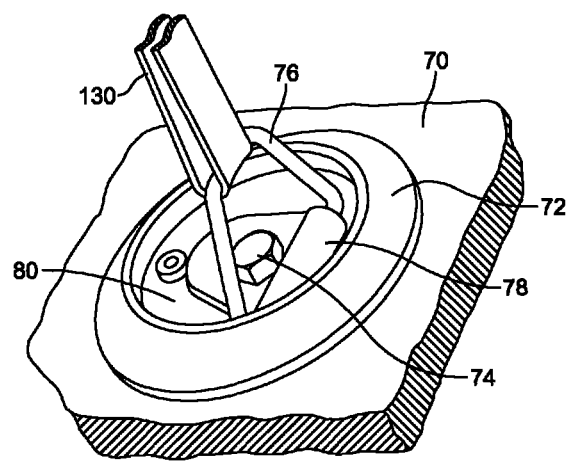
FIG. 7 is a perspective view of the structure tie down of the type shown in FIG. 6.
Figure 8:
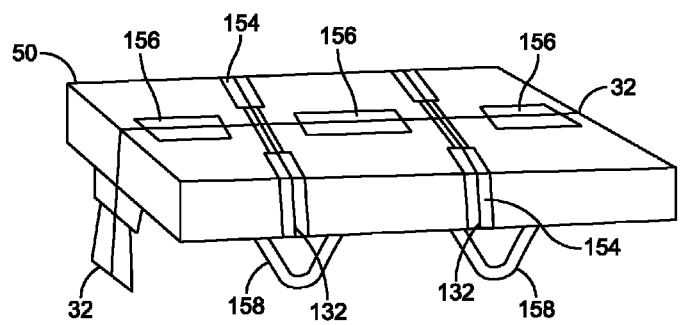
FIG. 8 is a side perspective drawing of an upper securing plate of the storage safe of the present invention.

Placed above storage case 52 is security plate 50 (shown more clearly in FIG. 8). Security plate 50 includes recesses and channels within its upper and side surfaces to receive longitudinal and latitudinal cables 30 and 130 and longitudinal and latitudinal adjustable cable locks 150 and 152. The recesses and channels provide spaces into which the cables and locks may be seated below the upper surface of security plate 50 thereby making tampering and or cutting of the cables extremely difficult. Security plate 50 may be fabricated of high density plastic polymer materials capable of withstanding high temperatures and impact damage. Suitable materials for fabricating security plate 50 include polyethylene, polypropylenes, polycarbonates and nylons as well as combinations of the foregoing. Below storage container 52 is optional security base 60 which can provide for additional storage. Alternatively, optional security base 60 can be replaced by one or more additional storage containers. On the lower surface of outer shell 5 are support legs 62 for resting the storage case of the present invention on a structure storage support surface. In the embodiment shown, latitudinal cable 132 is shown engaged with cleat 76 of structure tie down discussed more thoroughly in FIGS. 6 and 7. It will however be understood that cleat 76 can also engage a separate cable segment which may in turn traverse cable voids 100 in outer shell base 20.

Figure 6:
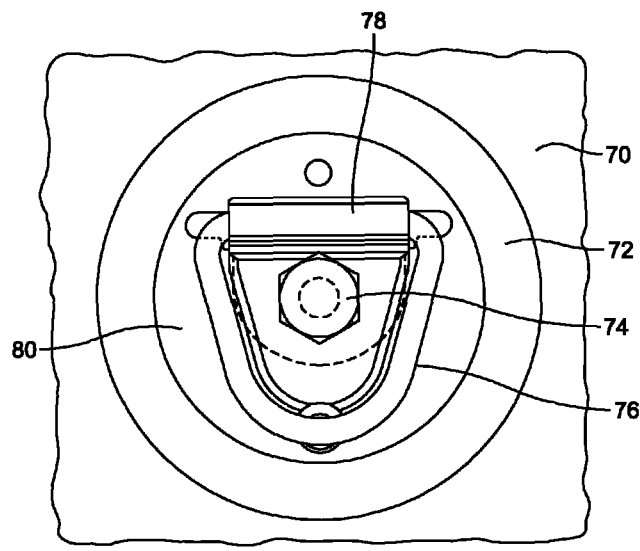
FIG. 6 is a top down view of a structure tie down of the type used to secure the storage safe of the present invention to a structure.

FIG. 6 and FIG. 7 show one example of a prior art structure tie down of the type useful in securing the storage safe of the present invention to a mobile or immobile structure. Structure tie down 70 is positioned within or on a planar surface such as a floor. Structure tie down 70 includes annular support ring 72, anchor bolt 74, cleat 76, hinge 78 and recessed base 80. It will be understood that recessed base 80 may typically be at or lower than the surface onto which structure tie down 70 is mounted. Annular support ring 72 is of sufficient depth so that cleat 76 and hinge 78 are generally positioned below the upper surface of annular ring 72. Anchor bolt 74 is preferably attached directly to cross member such as a vehicle chassis or to a mounting plate attached to a mobile or immobile structure so that structure tie down 70 is securely and permanently affixed to the structure. In FIG. 7 there is shown the structure tie down of FIG. 6 engaged at cleat 76 with a segment of latitudinal cable 130. It will likewise be appreciated that cleat 76 may also be engaged with a segment of longitudinal cable 30 or a separate cable segment which may traverse cable voids 100.

It will also be appreciated that the storage safe of the present invention may, upon removal from a motor vehicle, be mounted securely to similar types of tie downs and other securing devices that may be found in residences, places of business and hotel rooms. In this regard, the storage safe of the present invention is portable and the attendant advantages of using, transporting and storing firearms safely and securely in the tamper resistant outer shell is not limited to use in motor vehicles.

FIG. 8. shows a side perspective drawing of securing plate 50 of the storage safe of the present invention. Securing plate 50 is of similar dimensions and is sized so as to fit completely within outer shell 5. Security plate 50 includes channels 154 and recesses 156 within its upper and side surfaces to receive longitudinal and latitudinal cables 30 and 130 and longitudinal and latitudinal adjustable cable locks 150 and 152 respectively. Recesses 156 and channels 154 provide indentations and cut-outs into which the cables and locks may be seated below the upper surface of security plate 50. By placing the cables and locks below the upper surface of security plate 50 access to the cables and locks and possible cutting of the cables or attempted picking of the locks becomes extremely difficult. Additionally, by recessing the cables and locks, the upper surface of security plate 50 becomes essentially planar providing a more pleasing aesthetic appearance. Below and depending downwardly from security plate 50 are cable loops 158. Cable loops 158 can receive a separate cable segment which may in turn traverse cable voids 100 in outer shell base 20.

Figure 9:
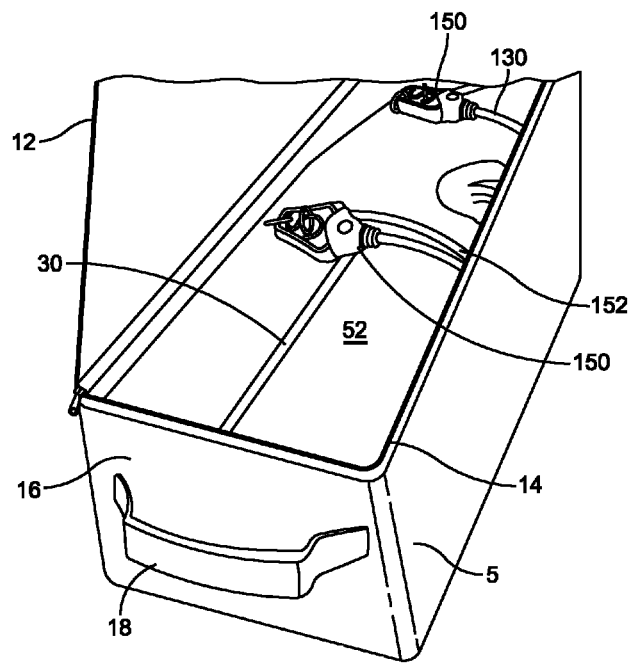
FIG. 9 is a partial front top perspective view of the storage safe of the present invention showing the securing cables in place.

FIG. 9 shows a partial front top perspective view of the storage safe of the present invention showing longitudinal and latitudinal cables 30 and 130 and longitudinal and latitudinal adjustable cable locks 150 and 152 in place. Top wall 12 of outer shell 5 defining a generally rectangular shape is shown open to reveal the contents therein. Closure element 14 separating top wall 12 at the upper side and front wall surfaces is shown in the open state. In this embodiment, closure element 14 may be a heavy duty zipper formed of metal alloys which are resistant to tampering and/or forcible entry by cutting or prying. Closure element 14 may also be provided with an external lock for securing closure element to one end of outer shell 5. At sidewall 16 carrying handle 18 is present to provide a means to grip and carry the outer shell but also lends an innocuous appearance to storage safe 1. Within outer shell 5 are shown storage container 50 secured in place by longitudinal and latitudinal cables 30 and 130 and longitudinal and latitudinal adjustable cable locks 150 and 152 respectively.

As may be understood, storage container 50 is held securely and tightly in place by the flexible cage that is formed by longitudinal and latitudinal cables 30 and 130 and longitudinal and latitudinal adjustable cable locks 150 and 152. By tightly securing and locking the cables in place over the contents of storage safe 1, outer shell 5 substantially conforms to the shape of the storage container (or containers) contents stored within thereby making access to the storage container largely tamper proof.

Figure 10:
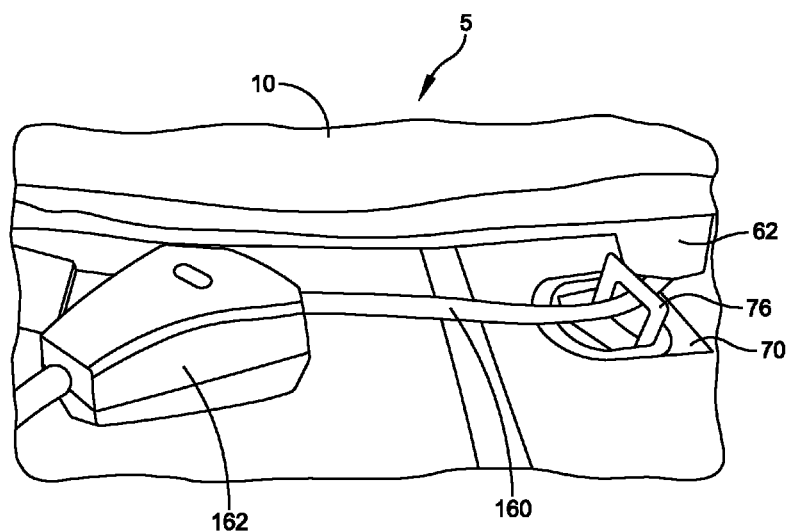
FIG. 10 is side perspective view of the cable securing mechanism used in the storage safe of the present invention shown in operative contact with a structure tie down.

In FIG. 10 there is a side perspective view of the cable securing mechanism used in the present invention shown in operative contact with cleat 76 of structure tie down 70. Cable segment 160 is shown engaged with and running through cleat 76 with adjustable cable lock 162 and in turn through cable voids 100 in outer shell base 20. Cable segment 160 is of sufficient length that it may be threaded through two or more structure tie downs and when cable segment 160 or longitudinal and latitudinal cables 30 and 130 are in operative contact with the structure tie or other securing device permanently affixed to the motor vehicle (collectively, vehicle mounting systems), the tightening of the longitudinal and latitudinal adjustable cable locks 150 and 152 or adjustable cable lock 162 will cause outer shell 5 to slightly deflect its shape and in so doing, substantially cover the structure tie down so as to make both the structure tie down and the securing points below outer shell 5 unobservable to the ordinary viewer.

While the foregoing description and drawings represent the exemplary embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What I claim is:

1. A method for securing a storage safe comprising the steps of:
   providing a flexible generally rectangular closeable outer shell having a top, a bottom, a pair of sidewalls, a front and a rear and wherein said outer shell further comprises a plurality of cable conduit channels positioned on said bottom, sidewalls, front and rear;

providing at least one wire cable of a predefined length substantially disposed within said cable conduit channel wherein said cable traverses the bottom of said outer shell and at least one of said sidewalls or said front and rear and further wherein said wire cable ends extend beyond said cable conduit channels;

providing at least one adjustable cable lock in operative contact with said at least one wire cable end;

providing at least one storage container positioned within flexible generally rectangular closeable outer shell;

wherein the at least one wire cable is positioned within said wire conduit channel and is drawn down upon and is tightened on said storage container and further wherein said at least one adjustable cable lock engages the opposite end of said at least one wire cable end and securely locks at least one wire cable in place.

2. The method of claim 1 further providing a security plate positioned on an upper surface of the at least one said storage container.

3. The method of claim 2 further providing a bottom plate positioned on a lower surface of the at least one said storage container.

4. The method of claim 1 further providing a plurality of storage containers.

5. The method of claim 4 further providing a bottom plate positioned on a lower surface of the at least one said storage container.

6. The method of claim 1 further providing a plurality of wire cables of predefined length and a plurality of adjustable cable locks engaging the ends of said wire cables.

7. The method of claim 1 wherein said bottom comprises a plurality of voids and further comprises a cable segment and adjustable lock for securing said safe to a structure tie down.

8. The method of claim 1 wherein said outer shell is comprised of a fabric selected from the group consisting of ballistic plastics, plastic resin composite materials, fiberglass materials, metal armors, ballistic nylon, Kevlar®, CUT-TEX® pro, KOVENEX®, DuraFab® and combinations thereof.

9. The method of claim 1 further providing a closure element.

10. The method of claim 9 wherein the closure element is selected from the group consisting of zippers, hook and loop fasteners, locking snap-fits, twist and locks, tuck locks conventional locks, combination locks, digital tumblers and combinations thereof.

11. A method for securing a storage safe comprising the steps of:

providing a closeable outer shell having a top, a bottom, a pair of sidewalls, a front and a rear and wherein said outer shell further comprises at least one longitudinal cable conduit channel positioned on said bottom and said front and rear and at least one latitudinal cable conduit channels position on said bottom and said sidewalls;

providing a plurality of wire cables of predefined length substantially disposed within said cable conduit channels wherein said longitudinal cable traverses the bottom of said outer shell and said front and rear, said latitudinal cable traverses the bottom of said outer shell and said sidewalls or further wherein said wire cable ends extend beyond said cable conduit channels;

providing at least one adjustable cable lock in operative contact with each wire cable ends;

providing at least one storage container within said outer shell;

providing at least one security plate positioned on a top surface of said storage container;

wherein the wire cables are positioned within said wire conduit channels and are drawn down upon and tightened on said storage container and further wherein said each adjustable cable lock engages the opposite end of said wire cables end to securely lock at least one wire cable in place.

12. The method of claim 11 wherein said bottom comprises a plurality of voids and further comprises a cable segment and adjustable lock for securing said safe to a structure tie down.

13. The method of claim 11 further providing a closure element.

14. The method of claim 13 wherein the closure element is selected from the group consisting of zippers, hook and loop fasteners, locking snap-fits, twist and locks, tuck locks, conventional locks, combination locks and, digital tumblers and combinations thereof.

15. A method for securing a storage safe comprising the steps of:

providing a closeable outer shell having a top, a bottom, a pair of sidewalls, a front and a rear and wherein said outer shell further comprises a plurality of cable conduit channels positioned on said bottom, sidewalls, front and rear;

providing at least one wire cable of a predefined length substantially disposed within said cable conduit channel wherein said cable traverses the bottom of said outer shell and at least one of said sidewalls or said front and rear and further wherein said wire cable ends extend beyond said cable conduit channels;

providing at least one adjustable cable lock in operative contact with said at least one wire cable end;

providing at least one storage container;

drawing down and tightening the at least one wire cable positioned within said wire conduit channel onto said storage container and engaging said at least one adjustable cable lock with the opposite end of said at least one wire cable end and securely locking said at least one wire cable in place to secure the storage container.

16. The method of claim 15 wherein said outer shell is comprised of bullet proof and bullet resistant rigid and semi rigid high density plastics, fiberglass materials, metal armor and/or combinations thereof.

17. The method of claim 15 providing a plurality of wire cables of predefined length and a plurality of adjustable cable locks and engaging the ends of said wire cables.

18. The method of claim 15 wherein said bottom comprises a plurality of voids and further comprises a cable segment and adjustable lock for securing said storage safe to a structure tie down.

19. The method of claim 18 wherein the tie down is secured to a mobile or an immobile structure.

* * * * *